(12) United States Patent
Hashimoto et al.

(10) Patent No.: US 10,356,272 B2
(45) Date of Patent: Jul. 16, 2019

(54) PHOTOELECTRIC CONVERSION DEVICE, IMAGE READING APPARATUS, IMAGE FORMING APPARATUS, AND METHOD OF PHOTOELECTRIC CONVERSION

(71) Applicants: Hideki Hashimoto, Kanagawa (JP); Masamoto Nakazawa, Kanagawa (JP)

(72) Inventors: Hideki Hashimoto, Kanagawa (JP); Masamoto Nakazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/176,395

(22) Filed: Jun. 8, 2016

(65) Prior Publication Data

US 2016/0373604 A1    Dec. 22, 2016

(30) Foreign Application Priority Data

Jun. 16, 2015 (JP) .................................. 2015-121471

(51) Int. Cl.
| | |
|---|---|
| *H04N 1/40* | (2006.01) |
| *H04N 1/193* | (2006.01) |
| *H04N 5/361* | (2011.01) |
| *H04N 5/369* | (2011.01) |
| *H04N 5/378* | (2011.01) |

(52) U.S. Cl.
CPC ............. *H04N 1/193* (2013.01); *H04N 5/361* (2013.01); *H04N 5/3694* (2013.01); *H04N 5/3698* (2013.01); *H04N 5/378* (2013.01)

(58) Field of Classification Search
CPC ...... H04N 1/193; H04N 5/361; H04N 5/3694; H04N 5/3698; H04N 5/378; H04N 1/40
USPC .................................................. 358/445, 446
See application file for complete search history.

(56) References Cited

U.S. PATENT DOCUMENTS

| | | | |
|---|---|---|---|
| 6,838,651 B1 * | 1/2005 | Mann ................ | H01L 27/14645 250/208.1 |
| 8,553,114 B2 | 10/2013 | Uchida | |
| 2004/0032628 A1 | 2/2004 | Sato et al. | |
| 2006/0209360 A1 | 9/2006 | Sakakibara | |
| 2007/0188638 A1 | 8/2007 | Nakazawa et al. | |

(Continued)

FOREIGN PATENT DOCUMENTS

| | | |
|---|---|---|
| EP | 1 968 307 A2 | 9/2008 |
| JP | 2004-048549 | 2/2004 |

(Continued)

OTHER PUBLICATIONS

U.S. Appl. No. 14/873,628, filed Oct. 2, 2015.

(Continued)

*Primary Examiner* — Cheukfan Lee
(74) *Attorney, Agent, or Firm* — Oblon, McClelland, Maier & Neustadt, L.L.P.

(57) ABSTRACT

A photoelectric conversion device includes a plurality of light receiving elements, a plurality of A/D conversion units, and an offset giving unit. The light receiving elements are arrayed in one direction and each convert a light signal into an electrical signal. The A/D conversion units perform A/D conversion on the electrical signals output from the light receiving elements. The offset giving unit gives an offset voltage of a certain level to the electrical signals output from the light receiving elements without flowing a steady current before the electrical signals are input into the A/D conversion units.

5 Claims, 13 Drawing Sheets

(56) References Cited

U.S. PATENT DOCUMENTS

| | | |
|---|---|---|
| 2008/0211946 A1 | 9/2008 | Uchida |
| 2008/0252787 A1 | 10/2008 | Nakazawa et al. |
| 2009/0174588 A1* | 7/2009 | Muenter ............... H03M 1/007 |
| | | 341/155 |
| 2010/0027061 A1 | 2/2010 | Nakazawa |
| 2010/0171998 A1 | 7/2010 | Nakazawa |
| 2011/0026083 A1 | 2/2011 | Nakazawa |
| 2011/0051201 A1 | 3/2011 | Hashimoto et al. |
| 2011/0063488 A1 | 3/2011 | Nakazawa |
| 2011/0205386 A1* | 8/2011 | Koseki ................. H04N 5/3742 |
| | | 348/222.1 |
| 2012/0008173 A1 | 1/2012 | Konno et al. |
| 2012/0092732 A1 | 4/2012 | Nakazawa |
| 2012/0224205 A1 | 9/2012 | Nakazawa |
| 2013/0063792 A1 | 3/2013 | Nakazawa |
| 2014/0029065 A1 | 1/2014 | Nakazawa |
| 2014/0204427 A1 | 7/2014 | Nakazawa |
| 2014/0204432 A1 | 7/2014 | Hashimoto et al. |
| 2014/0211273 A1 | 7/2014 | Konno et al. |
| 2014/0368893 A1 | 12/2014 | Nakazawa et al. |
| 2015/0098117 A1 | 4/2015 | Marumoto et al. |
| 2015/0116794 A1 | 4/2015 | Nakazawa |
| 2015/0163378 A1 | 6/2015 | Konno et al. |
| 2015/0222790 A1 | 8/2015 | Asaba et al. |
| 2015/0304517 A1 | 10/2015 | Nakazawa et al. |
| 2015/0353681 A1 | 12/2015 | Kwon et al. |
| 2016/0003673 A1 | 1/2016 | Hashimoto et al. |
| 2016/0006961 A1 | 1/2016 | Asaba et al. |
| 2016/0088179 A1 | 3/2016 | Nakazawa et al. |
| 2017/0201700 A1* | 7/2017 | Hashimoto .......... H04N 5/3575 |

FOREIGN PATENT DOCUMENTS

| | | |
|---|---|---|
| JP | 2005-101985 | 4/2005 |
| JP | 2008-219293 | 9/2008 |
| JP | 2008-271159 | 11/2008 |
| JP | 2009-296423 | 12/2009 |
| JP | 2010-103911 | 5/2010 |
| JP | 2010-259109 | 11/2010 |
| JP | 2011-24109 | 2/2011 |
| JP | 2012-237780 | 12/2012 |
| JP | 2015-033091 | 2/2015 |

OTHER PUBLICATIONS

U.S. Appl. No. 14/922,546, filed Oct. 26, 2015.
U.S. Appl. No. 14/988,802, filed Jan. 6, 2016.
Partial European Search Report dated Oct. 20, 2016 in Patent Application No. 16174603.7.
P. Donegan, et al., "A High Speed CMOS Dual Line Scan Imager for Industrial Applications" 2011 International Image Sensor Workshop, XP055310074, Jun. 8, 2011, 4 Pages.
Ernst Bodenstorfer, et al., "High-Speed Line-Scan Camera with Multi-Line CMOS Color Sensor" 2012 IEEE Computer Society Conference on Computer Vision and Pattern Recognition Workshops, XP032206751, 2012, pp. 9-14.
Office Action dated Nov. 20, 2018 in Japanese Patent Application No. 2015-121471, 3 pages.

* cited by examiner

PHOTOELECTRIC CONVERSION DEVICE, IMAGE READING APPARATUS, IMAGE FORMING APPARATUS, AND METHOD OF PHOTOELECTRIC CONVERSION

CROSS-REFERENCE TO RELATED APPLICATIONS

The present application claims priority under 35 U.S.C. § 119 to Japanese Patent Applications No. 2015-121471 filed on Jun. 16, 2015. The contents of which are incorporated herein by reference in their entirety.

BACKGROUND OF THE INVENTION

1. Field of the Invention

The present invention relates to photoelectric conversion devices, image reading apparatuses, image forming apparatuses and methods of photoelectric conversion.

2. Description of the Related Art

A pixel signal output from a photoelectric conversion unit of an image sensor is converted into a digital signal by an A/D converter and is output to a downstream stage. There is a need to prevent an image signal (an electrical signal) from being saturated on the bottom side (a black side) of the A/D converter even when noise is generated in a pixel and a processing circuit.

For example, in Japanese Unexamined Patent Application Publication No. 2005-101985, disclosed is a solid-state imaging apparatus that includes, in a clamp system, a black-level detection circuit that detects a minimum black level of a serial signal and a clamp-level setting circuit that sets a clamp level based on the minimum black level. The set clamp level is, after analog conversion, fed back to a clamp circuit in a column processing circuit or an analog front-end circuit, and the black level of a signal that passes through is changed there.

However, there has been a problem in that, when an offset is given to a plurality of A/D converters from one end side of arrayed pixels, the wiring for giving an offset voltage tends to be long and the distribution of the offset voltage arises due to the influence of the impedance of the wiring. Because a line sensor generally is of a pixel size larger than that of an area sensor and is formed in a rectangular shape longer in one direction, there has been a problem in that the tendency of the distribution of the offset voltage to arise is further increased.

SUMMARY OF THE INVENTION

According to one aspect of the present invention, a photoelectric conversion device includes a plurality of light receiving elements, a plurality of A/D conversion units, and an offset giving unit. The light receiving elements are arrayed in one direction and each convert a light signal into an electrical signal. The A/D conversion units perform A/D conversion on the electrical signals output from the light receiving elements. The offset giving unit gives an offset voltage of a certain level to the electrical signals output from the light receiving elements without flowing a steady current before the electrical signals are input into the A/D conversion units.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENT

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An object of an embodiment is to provide a photoelectric conversion devices that is capable of accurately performing A/D conversion by a plurality of A/D conversion units on an electric signal output from each of a plurality of light receiving elements that perform photoelectric conversion.

Figure 1:
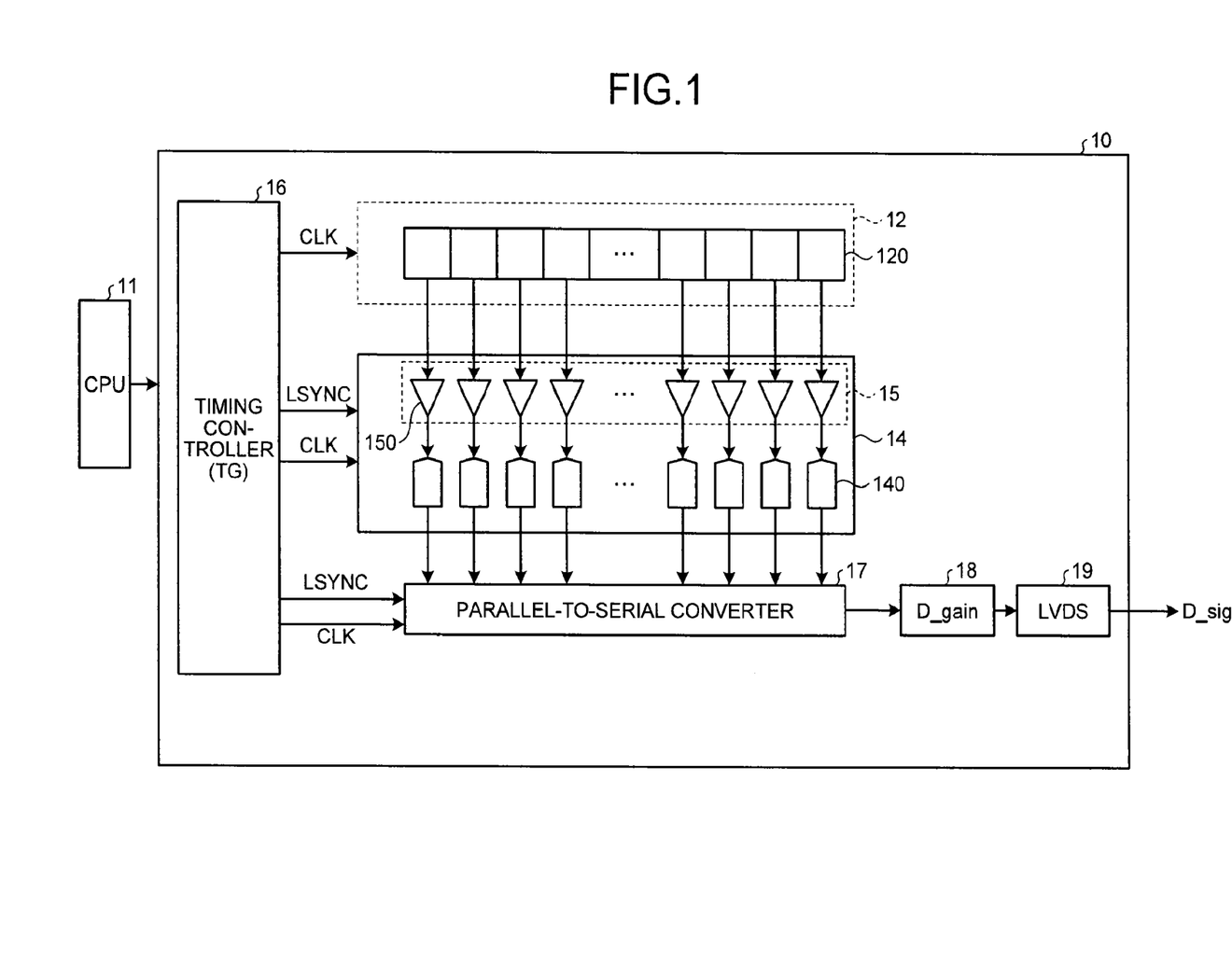
FIG. 1 is a block diagram illustrating a photoelectric conversion device and its periphery according to an embodiment.

With reference to the accompanying drawings, the following describes a photoelectric conversion device according to an exemplary embodiment. FIG. 1 is a block diagram illustrating a photoelectric conversion device 10 and its periphery according to the embodiment. The photoelectric conversion device 10 is a CMOS linear sensor that includes a photoelectric conversion unit 12, a signal processing unit 14, a timing controller (timing generator (TG)) 16, a parallel-to-serial converter 17, a digital amplifier 18, and an LVDS 19, and operates in accordance with the control of a CPU 11, for example.

The photoelectric conversion unit 12 includes a plurality of light receiving elements (photodiodes) 120 that are arrayed in one direction and each convert a light signal into an electrical signal. Each of the light receiving elements 120 may include a circuit element such as a transistor that transfers electrical charges, and have all the functions as a pixel that performs photoelectric conversion and outputs a signal. In the following description, the light receiving element 120 may be described as a pixel. The photoelectric conversion unit 12 may be configured, by including a plurality of light receiving elements (photodiodes) that are arrayed in the one direction for each color of R, G, and B, and causing columns each of which contains three (or six) light receiving elements of R, G, and B to output a photoelectric converted signal, for example. The light receiving element 120 performs photoelectric conversion on reflected light from a document and output the result as an analog image signal. In the following description, substantially the same configurations are given the same reference signs.

The signal processing unit 14 includes an offset giving unit 15 and a plurality of A/D converters (A/D conversion units) 140, for example. The offset giving unit 15 includes a plurality of programmable gain amplifiers (PGAs) 150 that amplify (including when the gain is one) the respective analog signals output from the photoelectric conversion unit 12 and output the amplified signals to the respective A/D converters 140. The offset giving unit 15 gives an offset voltage of a certain level, without flowing a steady current, to the electrical signals output from the light receiving elements 120, before being input into the respective A/D converters 140, which will be described later. The A/D converters 140 are arrayed in the one direction along the light receiving elements 120, convert the analog signals output from the respective PGAs 150 into digital signals, and output the digital signals through a plurality of systems in which a single processing system is defined for each pixel (or each column), for example.

The parallel-to-serial converter 17 serializes a plurality of parallel-processed digital signals output from the signal processing unit 14, and outputs the serialized signal to the digital amplifier 18 of a downstream stage. The timing controller 16 generates timing control signals necessary to drive various units constituting the photoelectric conversion device 10.

The digital amplifier 18 performs digital amplification on the serial signal output from the parallel-to-serial converter 17, and outputs the amplified serial signal to the LVDS 19. The LVDS 19 receives the serial signal that is input from the digital amplifier 18 and outputs the received signal to an external device of a downstream stage as low voltage differential signaling (LVDS).

Figure 2A:
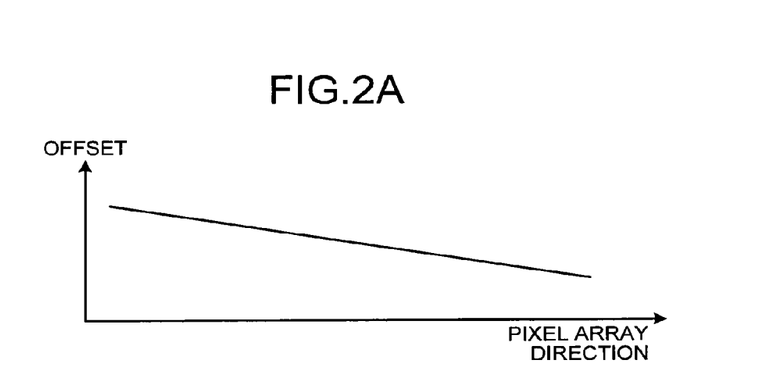
FIGS. 2A and 2B are diagrams illustrating the relation between an offset and image data after A/D conversion according to a comparative example.
Figure 2B:
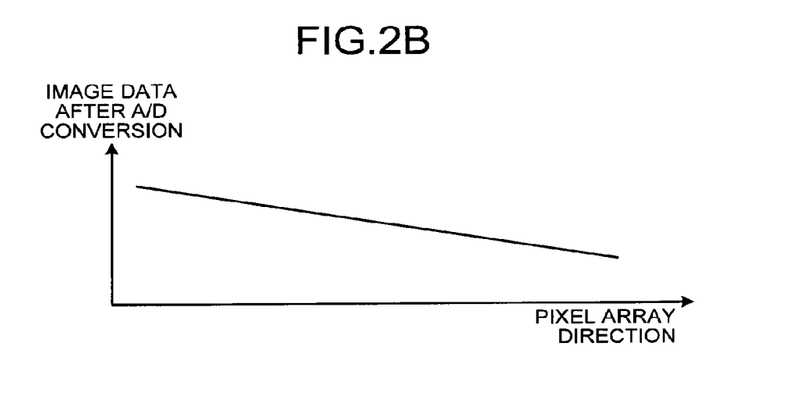

Next, the detail of the offset giving unit 15 will be described. First, the problem of a typical CMOS sensor in column A/D configuration will be described with reference to FIGS. 2A and 2B. FIGS. 2A and 2B are diagrams illustrating the relation between an offset and image data after A/D conversion according to a comparative example. In the typical CMOS sensor in column A/D configuration, in order to prevent the saturation of a signal on a black side of an A/D conversion unit, an offset voltage is applied to a signal line in an upstream stage thereof.

Typically, however, when the offset voltage is applied from the left-hand side of the pixel array direction to the right-hand side as illustrated in FIGS. 2A and 2B, the offset voltage is affected by wiring impedance, and the offset voltage holds a declining distribution, for example. Consequently, the image data after A/D conversion also is to hold a declining distribution. Furthermore, because the offset voltage of the column on the right-hand side in the pixel array direction is lowered, it may lead to the saturation of the signal on the black side of the A/D conversion unit. In general, because the line sensor is of a larger pixel size as compared to an area sensor and is formed in a shape longer in one direction, it is susceptible to the wiring impedance.

Figure 3:
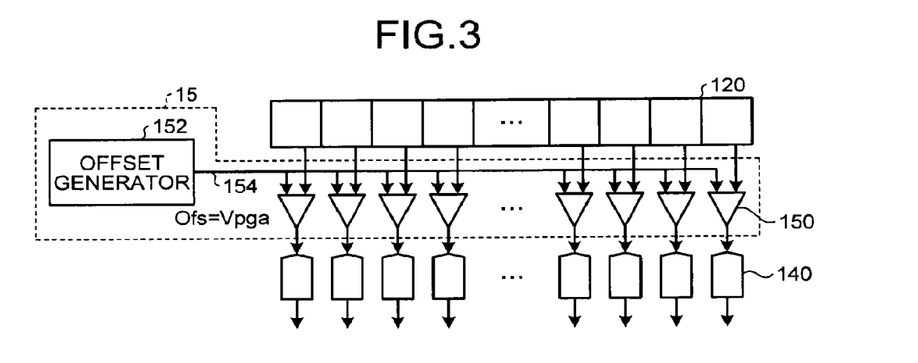
FIG. 3 is a block diagram illustrating the detail and the periphery of an offset giving unit.
Figure 4:
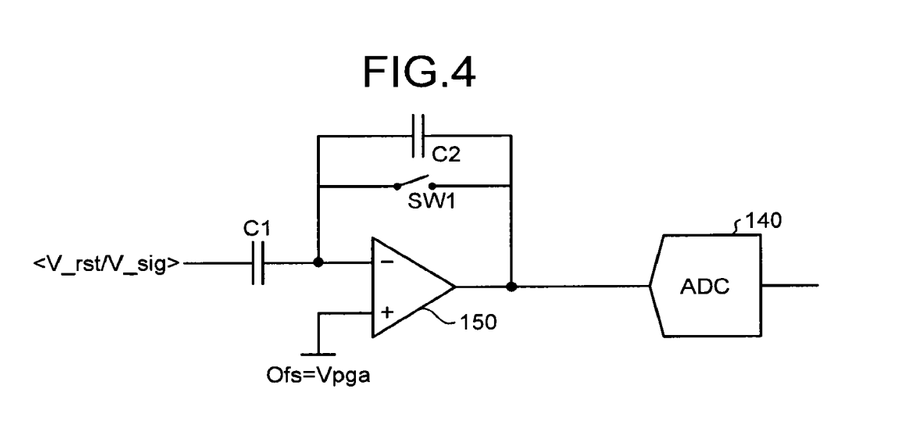
FIG. 4 is a diagram illustrating the detail of a periphery of a PGA.

FIG. 3 is a block diagram illustrating the detail and the periphery of the offset giving unit 15. FIG. 4 is a diagram illustrating the detail of a periphery of the PGA 150. The offset giving unit 15 includes a plurality of PGAs 150 as in the foregoing. The offset giving unit 15 further includes an offset generator 152 that generates an offset voltage (Ofs=Vpga), and wiring 154 (second wiring) that applies (inputs) the offset voltage generated by the offset generator 152 to a non-inverting input (a non-inverting input terminal) of each of the PGAs 150.

The offset generator 152 generates the offset voltage necessary to prevent the saturation of the signal on the black side of the A/D converter 140, which is set such that the signal is not saturated even when noise arises on the signal. Because the non-inverting input (the non-inverting input terminal) of each of the PGAs 150 is configured, for example, as a gate of a MOS transistor and is of high impedance, a steady current does not flow in the wiring 154. Consequently, the offset voltages applied to the non-inverting inputs of the respective PGAs 150 are substantially the same. Thus, the current that steadily flows in the wiring 154 is substantially zero, and therefore, even when the offset voltage is supplied from the offset generator 152 in the array direction (left-to-right direction) of the light receiving elements 120, the voltage does not drop.

Specifically, as illustrated in FIG. 4, in the PGA 150, when a reset level (V_rst) is input from the light receiving element 120 into an inverting input (an inverting input terminal), the SW1 is turned on, the inverting input terminal and an output terminal are short-circuited, and the inverting input terminal and the output terminal are both at a voltage level of Vpga. When a signal level (V_sig) is input from the light receiving element 120 into the inverting input (the inverting input terminal), the PGA 150 outputs an output voltage Vout=(V_rst−V_sig)×C1/C2+Vpga to the A/D converter 140.

Even when the offset voltage generated by the offset generator 152 is applied to the respective PGAs 150 through the wiring 154, after an input capacitor of the non-inverting input terminal of the PGA 150 is charged by electrical charges, the current does not flow steadily in the wiring 154 because the non-inverting input terminal of the PGA 150 is of high impedance. Thus, in each PGA 150, because the current that flows in the non-inverting terminal is substantially zero and the voltage drop due to the wiring length of the wiring 154 does not occur, a certain offset voltage (Vpga) can be added to the signal output from each of the light receiving elements 120 (or each column).

Figure 5A:
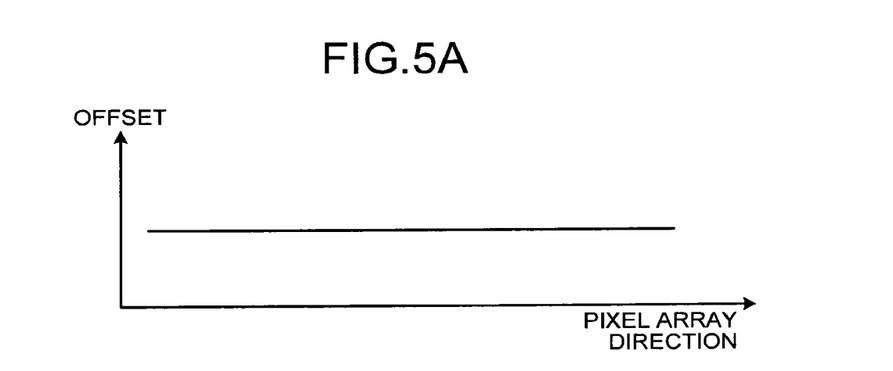
FIGS. 5A and 5B are diagrams illustrating an offset voltage that each PGA outputs and the result of A/D conversion that each A/D converter performed the A/D conversion on an image signal of uniform density.
Figure 5B:
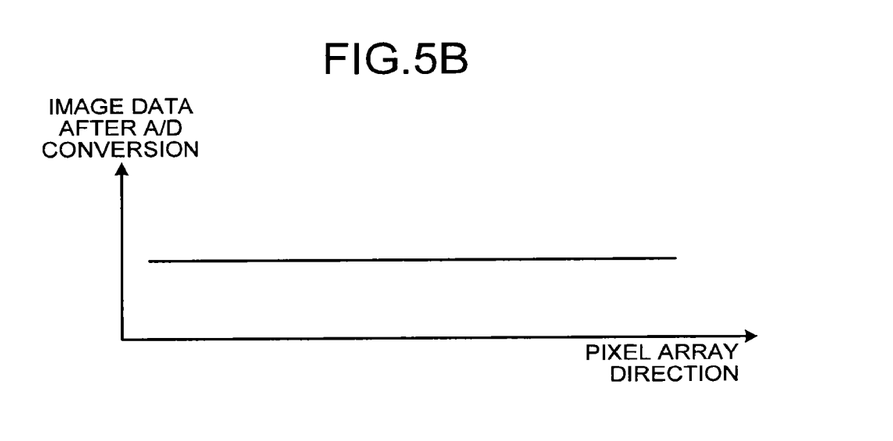

FIG. 5A is a diagram illustrating an offset voltage output from each of the PGAs 150 that are arrayed in the pixel array direction, and FIG. 5B is a diagram illustrating the result of A/D conversion that each of a plurality of A/D converters 140 performed the A/D conversion on an image signal of uniform density. As illustrated in FIGS. 5A and 5B, in the photoelectric conversion device 10, because the offset giving unit 15 is provided at an upstream stage of the A/D converters 140, the offset voltage given by the respective PGAs 150 is of a fixed voltage (Vpga). Thus, the photoelectric conversion device 10 can perform A/D conversion accurately even when the image signal is at a black level (when it is V_rst=V_sig). The photoelectric conversion device 10 can apply a substantially identical offset voltage to each pixel (or each column), and thus it can also prevent the saturation of the signal on the black side of the A/D converter 140 due to the drop of the offset voltage.

Figure 6A:
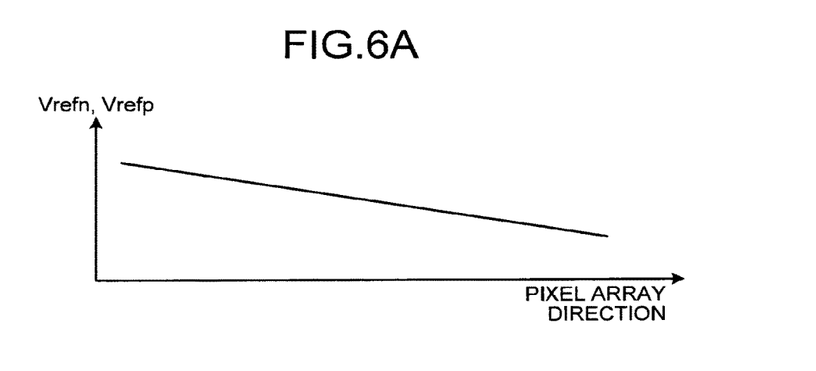
FIGS. 6A and 6B are diagrams illustrating the relation between a reference voltage of an A/D converter and image data after A/D conversion according to a comparative example.
Figure 6B:
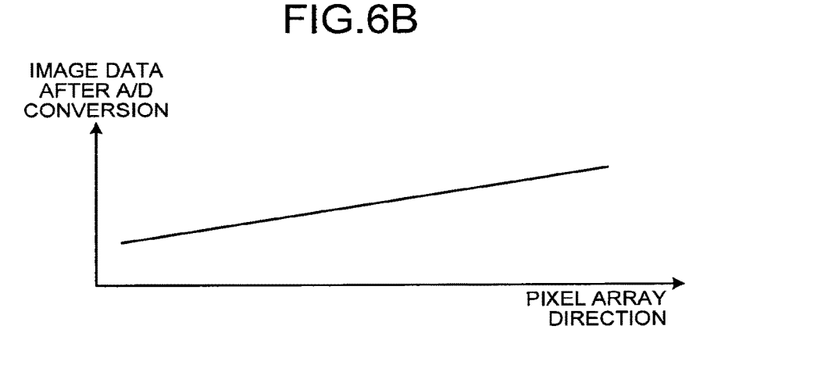

Next, the relation between a reference voltage applied to each of the A/D converters 140 and the offset voltage applied to each of the PGAs 150 will be described. FIGS. 6A and 6B are diagrams illustrating the relation between a reference voltage of an A/D converter and image data after A/D conversion according to a comparative example. When the reference voltage of a plurality of A/D converters is supplied from one end in the pixel array direction toward the other end by wiring, because the load of the A/D converter is large and a large current to some extent flows, the reference voltage of the A/D converter may vary by the impedance of the wiring.

For example, as illustrated in FIG. 6A, when the reference voltage of the A/D converter is applied from the left-hand side of the pixel array direction toward the right-hand side, the reference voltage may be affected by the wiring impedance, and the offset voltage may result in holding a declining distribution. Vrefp is a reference voltage on the top side (the upper side) of the A/D converter, and Vrefn is a reference voltage on the bottom side (the lower side). In this case, as illustrated in FIG. 6B, the image data after A/D conversion results in an ever-increasing distribution, and thus the black level is to hold an ever-increasing distribution. For example, when the resolution of the A/D converter at Vrefp=3 V and Vrefn=0 V is 10 bits, it assumes 1024/3000 LSB/mV.

Figure 7:
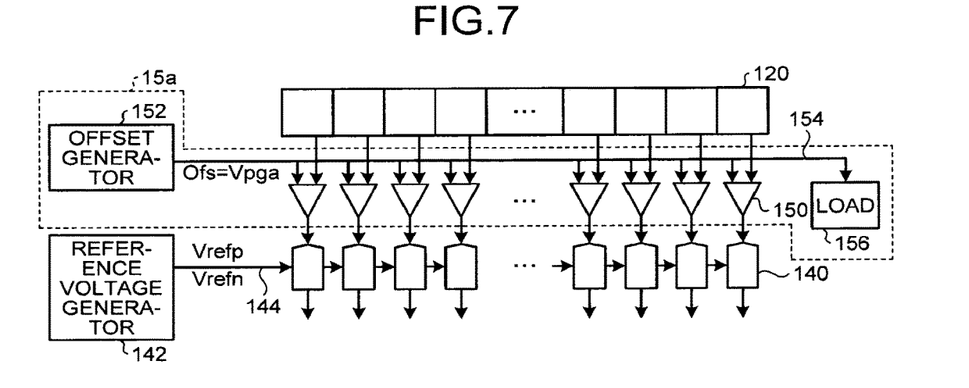
FIG. 7 is a block diagram illustrating the detail and the periphery of an offset giving unit according to a first modification.

FIG. 7 is a block diagram illustrating the detail and the periphery of the offset giving unit 15 (an offset giving unit 15a) according to a first modification. The offset giving unit 15a includes the PGAs 150, the offset generator 152, the wiring 154, and a load 156. A reference voltage generator (a reference voltage source) 142 generates a reference voltage (Vrefp, Vrefn) for each of the A/D converters 140, and applies the reference voltage to the respective A/D converters 140 through wiring 144 (first wiring).

The offset generator 152 and the reference voltage generator 142 are disposed on one end side of the array of the light receiving elements 120, and the load 156 is disposed on the other end side of the array of the light receiving elements 120. The load 156 is connected to the wiring 154, and is a pseudo-load that functions such that the current by the offset voltage generated by the offset generator 152 steadily flows in the wiring 154. That is, when the reference voltage varies depending on the length of the wiring 144 from the reference voltage generator 142, the load 156 makes the current steadily flow into the wiring 154 from the offset generator 152 by being connected to the wiring 154 and varies the offset voltage depending on the length of the wiring 154 from the offset generator 152 so as to offset the variation of the reference voltage.

Figure 8A:
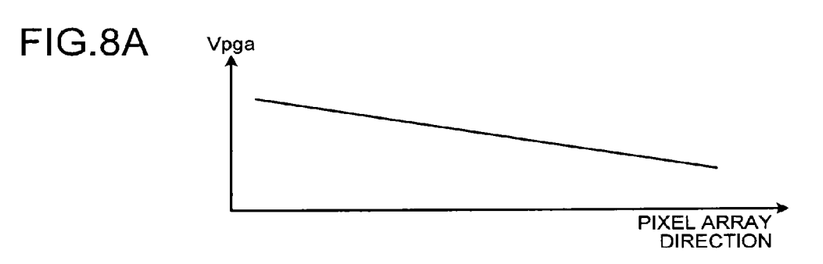
FIGS. 8A to 8D are diagrams illustrating an example of the operation of the photoelectric conversion device that includes the offset giving unit illustrated in FIG. 7.
Figure 8B:
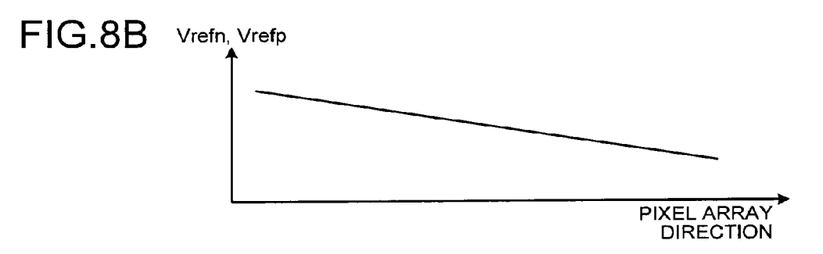
Figure 8C:
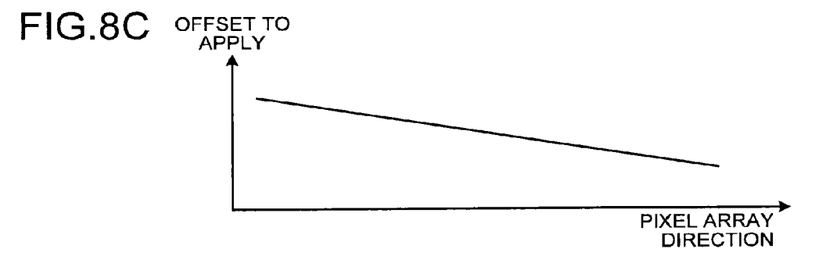

FIGS. 8A to 8D are diagrams illustrating an example of the operation of the photoelectric conversion device 10 that includes the offset giving unit 15a illustrated in FIG. 7. As illustrated in FIG. 8A, in the photoelectric conversion device 10 including the offset giving unit 15a, when the current flows in the wiring 154 by the load 156 being provided, the offset voltage Vpga of the wiring 154 holds a distribution declining from the left-hand side in the pixel array direction toward the right-hand side. As illustrated in FIG. 8B, due to the impedance of the wiring 144, the reference voltage (Vrefp, Vrefn) holds a distribution declining from the left-hand side in the pixel array direction toward the right-hand side. As illustrated in FIG. 8C, the offset voltage applied to each PGA 150 also holds a distribution declining from the left-hand side in the pixel array direction toward the right-hand side.

Figure 8D:
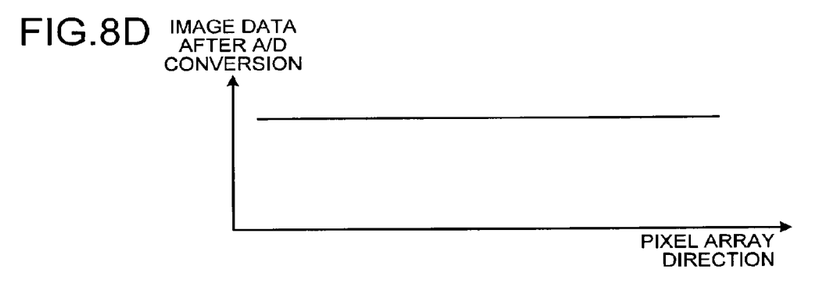

The load 156 forms a distribution of the offset voltage of the wiring 154 so as to offset the distribution of the reference voltage of the wiring 144. That is, when a distribution arises in the reference voltage of the wiring 144, the offset giving unit 15a makes the distribution of the offset voltage arise in the wiring 154. Thus, as illustrated in FIG. 8D, when A/D conversion is performed on an image signal of uniform density, pieces of the image data from the respective A/D converters 140 after the A/D conversion are substantially identical. In the photoelectric conversion device 10, by defining Vpga=Vrefn+α (α is a value that prevents the image signal from being below Vrefn even when noise occurs in a pixel circuit and other parts), the saturation of the signal on the bottom side of the A/D converter 140 is prevented.

Figure 9:
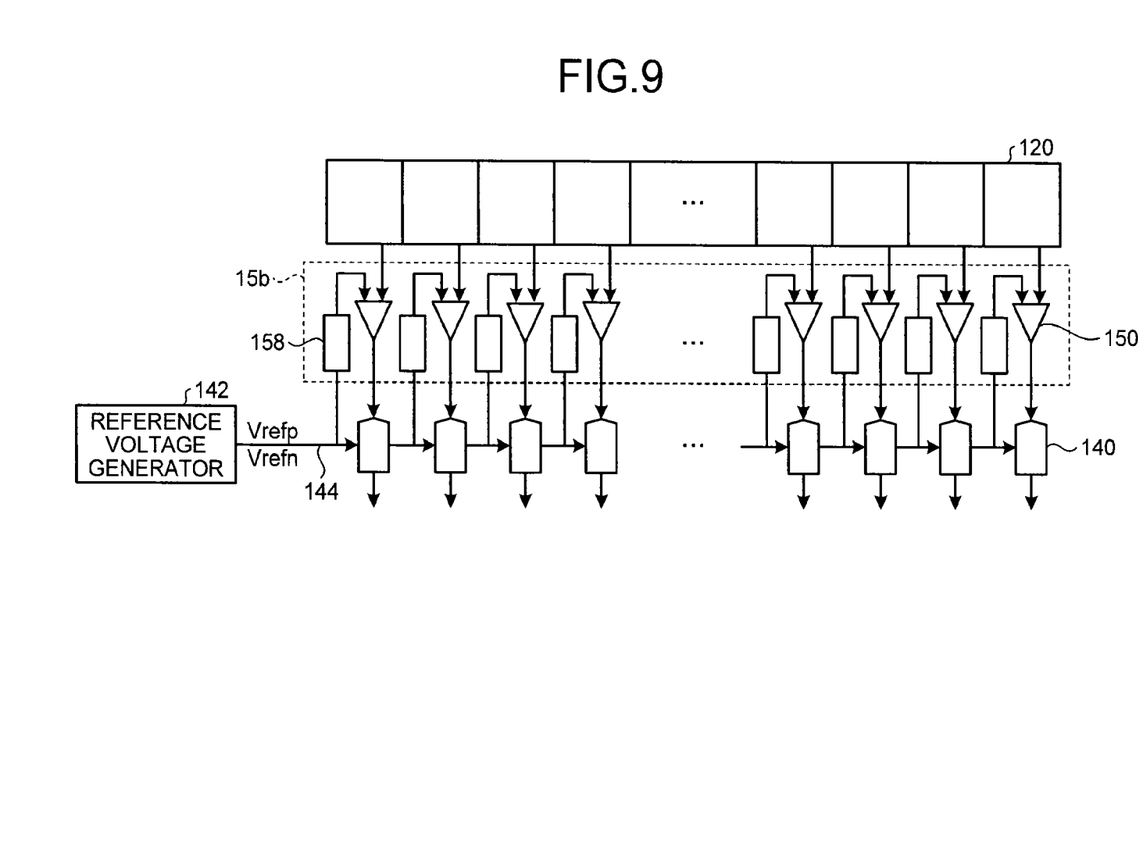
FIG. 9 is a block diagram illustrating the detail and the periphery of an offset giving unit according to a second modification.
Figure 10:
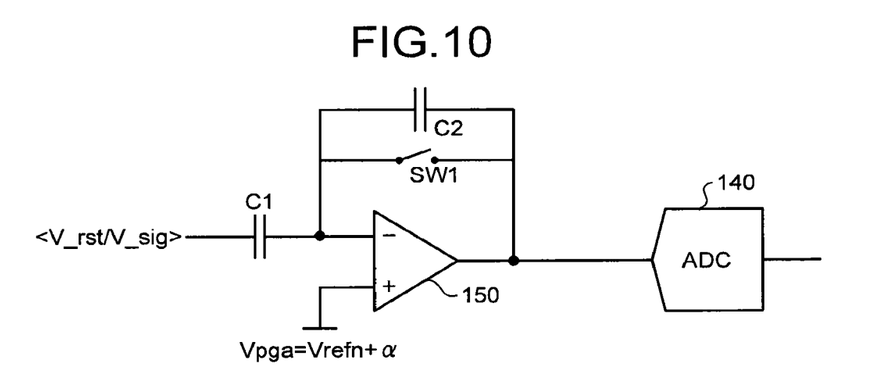
FIG. 10 is a diagram illustrating the detail of a periphery of a PGA in the offset giving unit.
Figure 11A:
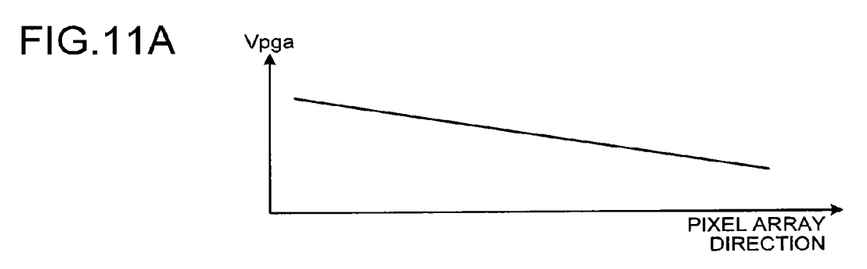
FIGS. 11A to 11D are diagrams illustrating an example of the operation of the photoelectric conversion device that includes the offset giving unit illustrated in FIG. 9.
Figure 11B:
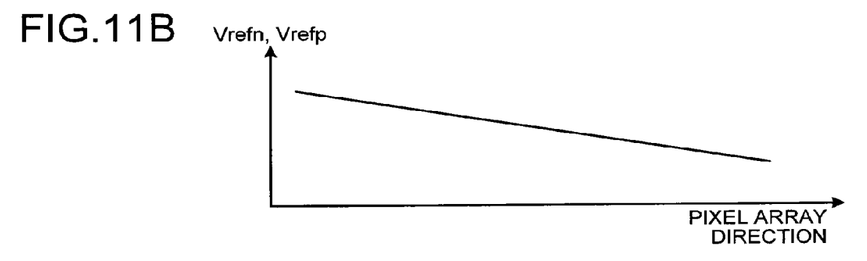
Figure 11C:
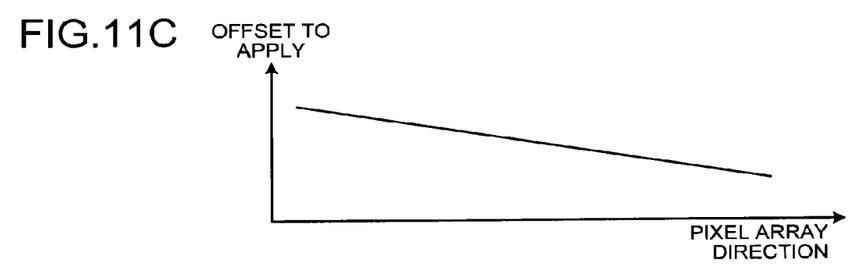
Figure 11D:
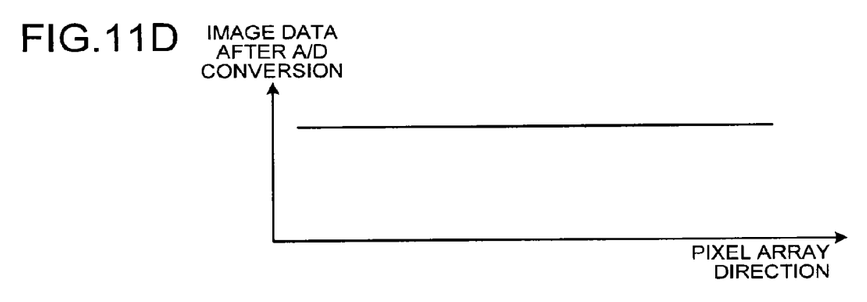

FIG. 9 is a block diagram illustrating the detail and the periphery of the offset giving unit 15 (an offset giving unit 15b) according to a second modification. FIG. 10 is a diagram illustrating the detail of a periphery of the PGA 150 in the offset giving unit 15b. The offset giving unit 15b includes the PGAs 150 and a plurality of offset generators 158.

The reference voltage generator 142 generates the reference voltage (Vrefp, Vrefn) for the A/D converters 140, and applies the reference voltage to the respective A/D converters 140 through the wiring 144 (the first wiring). The reference voltage generator 142 further applies a certain reference voltage to the offset generators 158 through the wiring 144. The offset generators 158 each input, by using the reference voltage applied from the reference voltage generator 142, a certain offset voltage to the non-inverting input terminals of the respective PGAs 150. Specifically, the offset generators 158 each generate the offset voltage by making a certain amount of shift in voltage with respect to the reference voltage that is applied to the respective A/D converters 140 through the wiring 144.

For example, when generating an offset voltage from Vrefn, the offset generators 158, as illustrated in FIG. 10, input the offset voltage of Vpga=Vrefn+α to the non-inverting terminals of the respective PGAs 150. Consequently, the tendency of drop in Vpga in the array direction of the light receiving elements 120 (the pixel array direction) and the tendency of drop in the reference voltage are to be substantially the same.

FIGS. 11A to 11D are diagrams illustrating an example of the operation of the photoelectric conversion device 10 that includes the offset giving unit 15b illustrated in FIG. 9. In the photoelectric conversion device 10 that includes the offset giving unit 15b, because the tendency of drop in Vpga in the array direction of the light receiving elements 120 and the tendency of drop in the reference voltage are substantially the same, the offset voltage that is applied to the image signals output from the respective light receiving elements 120 is also lowered in the same manner. Consequently, in the photoelectric conversion device 10 that includes the offset giving unit 15b, as the same as the operation that is illustrated in FIGS. 8A to 8D, when A/D conversion is performed on image signals of uniform density, pieces of the image data from the A/D converters 140 after the A/D conversion are substantially identical.

Next, described is a situation in which the photoelectric conversion device 10 includes the light receiving elements 120 that are arrayed in the one direction for each color of R, G, and B, a single column contains three light receiving elements 120 of R, G, and B, and the A/D conversion is performed, for each column, on a photoelectric converted signal, for example. When the light receiving elements 120 of R, G, and B are included in a single column, in order to effectively use the dynamic range of the A/D converter 140 for each color, the gain of the corresponding PGA 150 may be switched for each color.

Figure 12A:
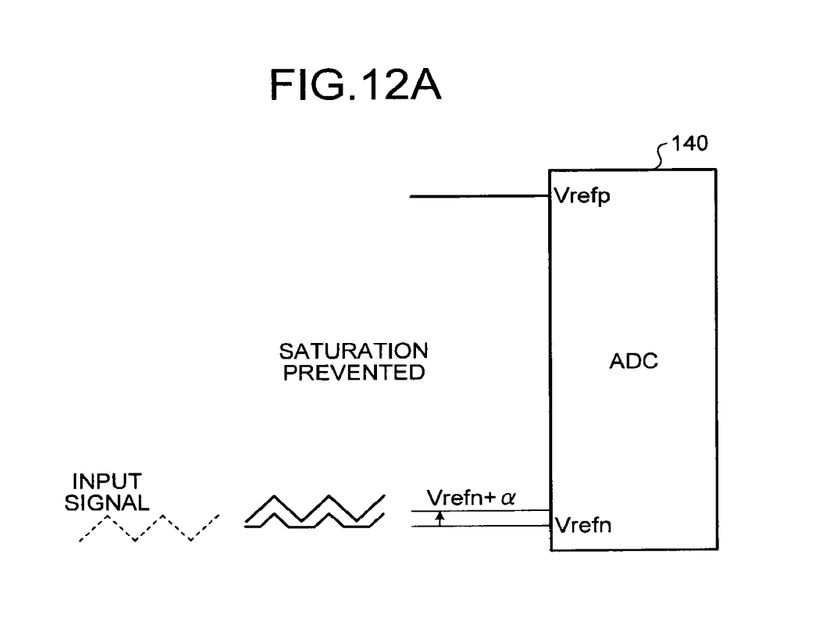
FIGS. 12A and 12B are diagrams illustrating an example of signal levels, which may arise when gain is switched for each color, on the black side of the A/D converter.
Figure 12B:
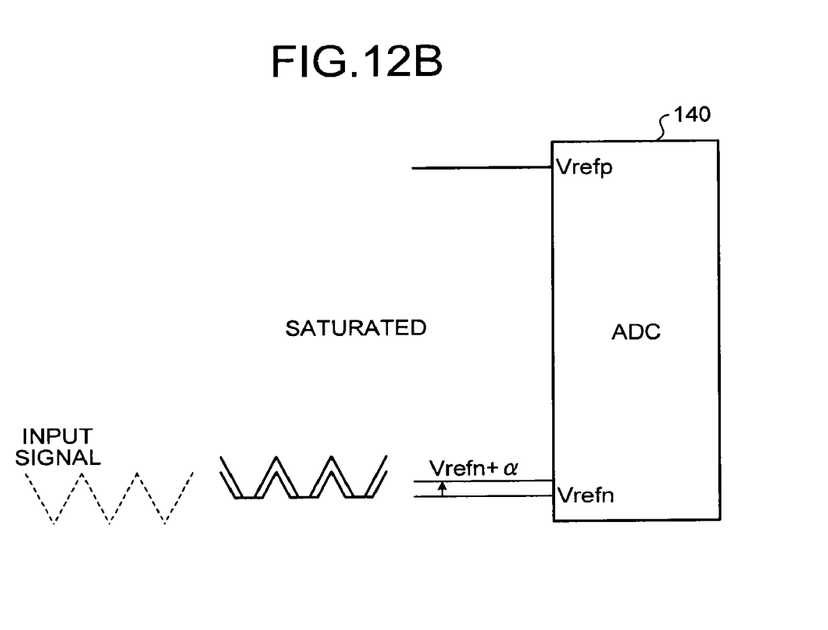

FIGS. 12A and 12B are diagrams illustrating an example of signal levels, which may arise when the gain is switched for each color, on the black side of the A/D converter. FIG. 12A illustrates an example of a state that the signal level on the black side of the A/D converter 140 is not saturated. FIG. 12B illustrates an example of a state that the signal level on the black side of the A/D converter 140 is saturated. When the gain before the A/D conversion is different for each color, it is conceivable that the signal on the black side is saturated at the input of the A/D converter 140.

When the setting gain of the PGA 150 is different for each color and the noise width of the black level is different for each color, if the offset level in each color is made identical, the saturation in the color of a small gain can be prevented by applying an offset voltage $Vrefn+\alpha$, but in the color of a large gain, the black level may be saturated to the bottom side even when the offset voltage $Vrefn+\alpha$ is applied. That is, when the black level is saturated to the bottom side, the gradation on the black side cannot be ensured.

Figure 13:
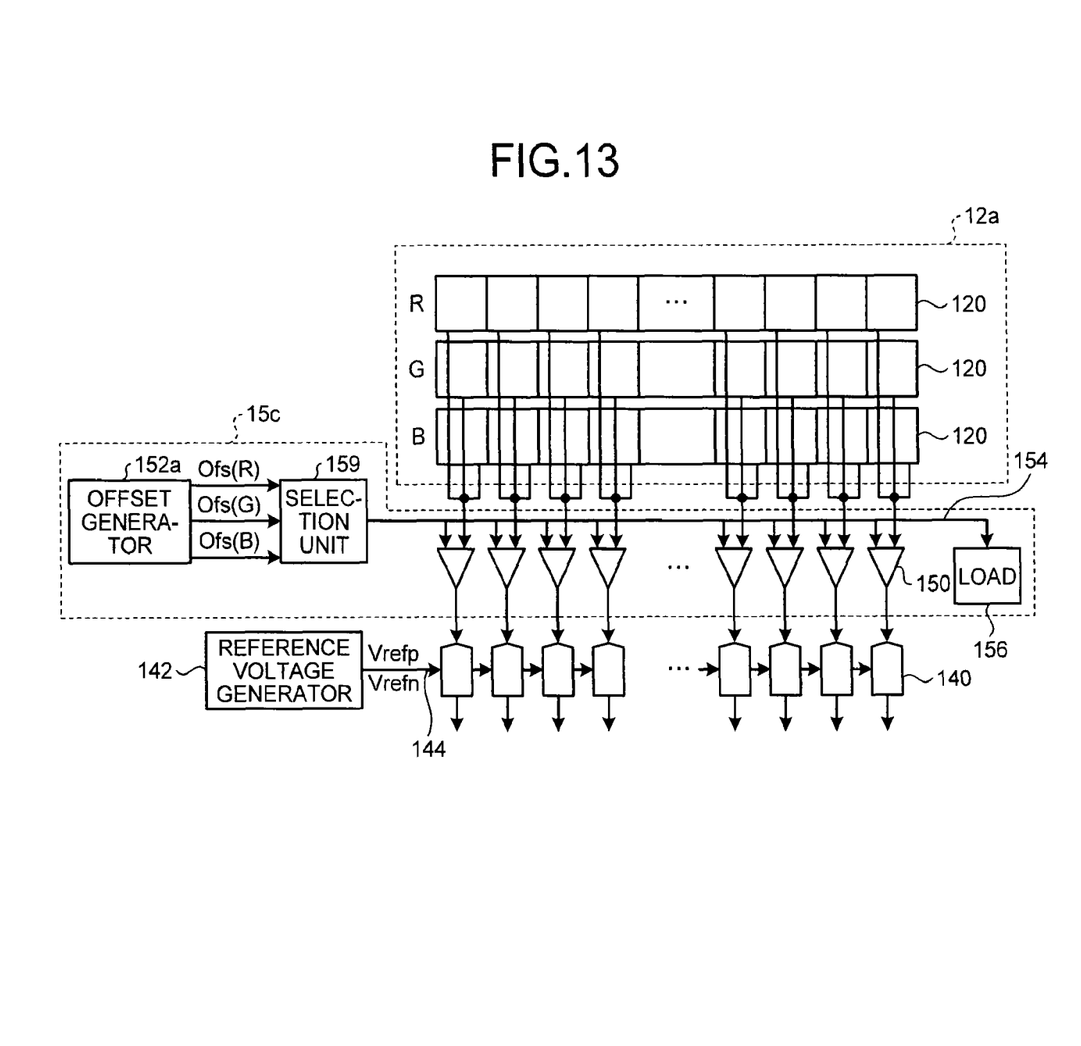
FIG. 13 is a block diagram illustrating the detail and the periphery of an offset giving unit according to a third modification.

FIG. 13 is a block diagram illustrating the detail and the periphery of the offset giving unit 15 (an offset giving unit 15c) that switches the offset voltage for each color according to a third modification. A photoelectric conversion unit 12a includes the light receiving elements 120 arrayed in the one direction for each color of R, G, and B of receiving light. The offset giving unit 15c includes the PGAs 150, an offset generator 152a, a selection unit 159, the wiring 154, and the load 156. The A/D converters 140 perform A/D conversion on electrical signals output from the respective light receiving elements 120 that receive light of different colors.

The offset generator 152a generates different offset voltages Ofs(R), Ofs(G), and Ofs(B) for each color of R, G, and B, respectively, and outputs them to the selection unit 159. The selection unit 159 selects, out of Ofs(R), Ofs(G), and Ofs(B), an offset voltage corresponding to the light receiving element 120 that received the light in any of the colors of R, G, and B in a column outputting the image signal. The selection unit 159 may be configured as a switching unit that switches the offset voltages that the offset giving unit 15c gives (or the offset voltages that the offset generator 152a generates) for each color received by the light receiving elements 120.

Figure 14:
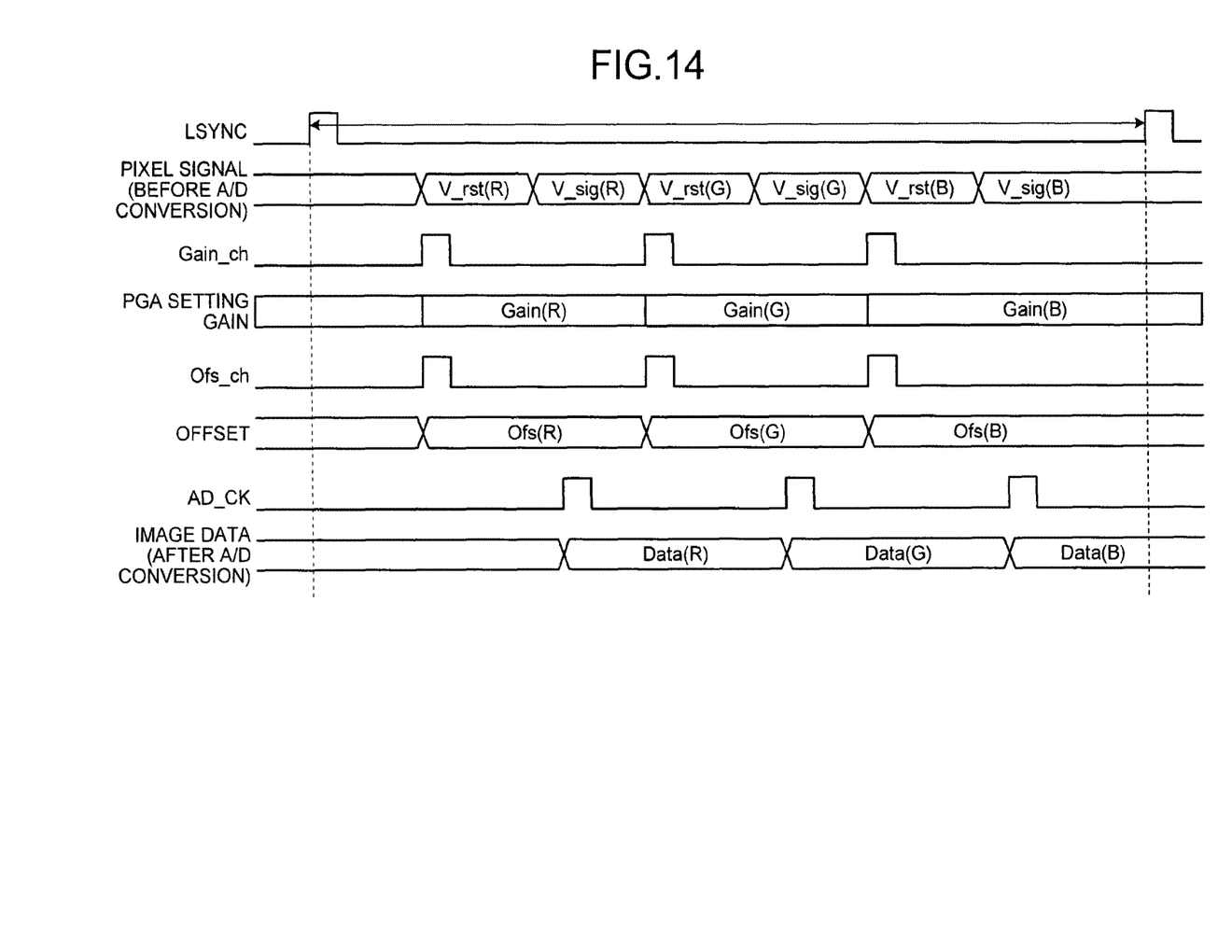
FIG. 14 is a timing chart illustrating operation timing of a photoelectric conversion device 10.

FIG. 14 is a timing chart illustrating operation timing of the photoelectric conversion device 10 that includes the offset giving unit 15c. As illustrated in FIG. 14, it is assumed that image signals (pixel signals) on which the light receiving elements 120 performed photoelectric conversion are output to the PGAs 150 in order of R, G, and B. LSYNC is a line synchronization signal. Gain_ch is a gain switching signal. Ofs_ch is an offset switching signal. AD_CK is a clock signal for A/D conversion in the A/D converters 140.

For example, the timing controller 16 switches, for the PGAs 150, the gain to the gain for R, Gain(R), at the timing that a reset level V_rst(R) of the light receiving elements 120 for R is output. At the same time, the timing controller 16 controls the selection unit 159 so as to switch the offset voltage of the PGA 150 to an offset voltage for R, Ofs(R). Then, after the gain and offset voltage for R are reflected, the timing controller 16 makes, at the timing that an image signal for R, V_sig(R), is being output, the A/D converters 140 perform A/D conversion and generate image data, Data(R). The photoelectric conversion device 10 performs the same operation for G and B also.

Figure 15A:
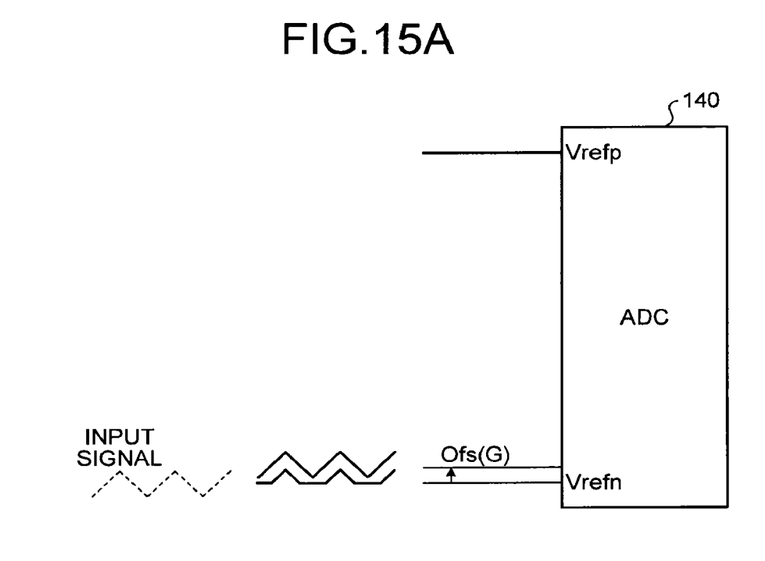
FIGS. 15A and 15B are diagrams illustrating an example of signal levels on the black side of the A/D converter when the photoelectric conversion device switches gain for each color.
Figure 15B:
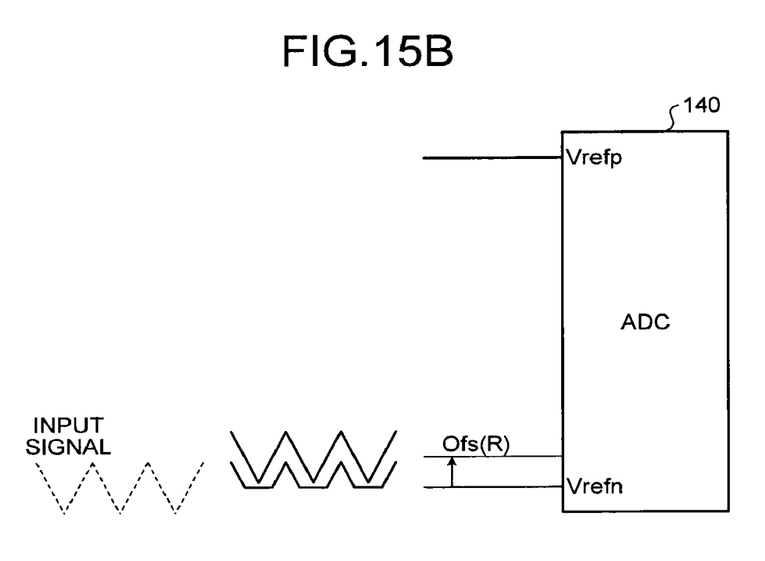

FIGS. 15A and 15B are diagrams illustrating an example of signal levels on the black side of the A/D converters 140 when the photoelectric conversion device 10 including the offset giving unit 15c switches the gain for each color. For example, when the gain for G out of R, G, and B is small and the gain for R is large, the photoelectric conversion device 10 including the offset giving unit 15c adds Ofs(G) at the time the signal of G is input as illustrated in FIG. 15A, and adds Ofs(R) at the time the signal of R is input as illustrated in FIG. 15B. Consequently, because the photoelectric conversion device 10 including the offset giving unit 15c can change the offset level for each color, even when the gain of the PGAs 150 is switched and the noise width of the black level is different for each color, this configuration can prevent the saturation of the signal level on the black side.

Figure 16:
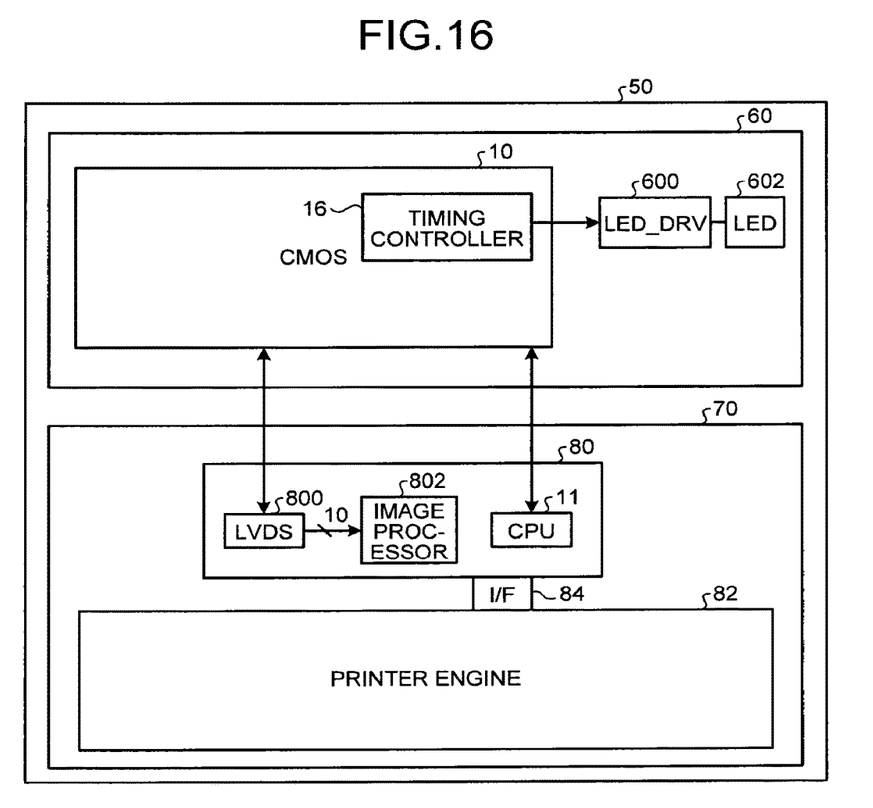
FIG. 16 is a block diagram illustrating an overview of an image forming apparatus provided with an image reading apparatus including the photoelectric conversion device.

Next, an image reading apparatus that includes the photoelectric conversion device 10 of the embodiment and an image forming apparatus will be described. FIG. 16 is a block diagram illustrating an overview of an image forming apparatus 50 provided with an image reading apparatus 60 including the photoelectric conversion device 10. The image forming apparatus 50 is a copying machine and a multifunction peripheral (MFP) that includes the image reading apparatus 60 and an image forming unit 70, for example.

The image reading apparatus 60 includes the photoelectric conversion device 10, an LED driver (LED_DRV) 600, and an LED 602, for example. The LED driver 600 drives the LED 602, in synchronization with a line synchronization signal that the timing controller 16 outputs, for example. The LED 602 irradiates a document with light. In the photoelectric conversion device 10, in synchronization with the line synchronization signal and others, the light receiving elements 120 receive reflection light from the document, generate electrical charges, and start accumulating the electrical charges. The photoelectric conversion device 10 then outputs image data to the image forming unit 70 after performing parallel-to-serial conversion and others.

The image forming unit 70 includes a processing unit 80 and a printer engine 82. The processing unit 80 and the printer engine 82 are connected through an interface (I/F) 84.

The processing unit 80 includes an LVDS 800, an image processor 802, and the CPU 11. The CPU 11 executes programs stored in a memory and others, and controls various units constituting the image forming apparatus 50 such as the photoelectric conversion device 10.

The photoelectric conversion device 10 outputs, to the LVDS 800, image data of an image that the image reading apparatus 60 reads, a line synchronization signal, a transmission clock, and other signals, for example. The LVDS 800 converts the received image data, the line synchronization signal, the transmission clock, and other signals into 10-bit parallel data. The image processor 802 performs image processing by using the converted 10-bit data, and outputs image data and other signals to the printer engine 82. The printer engine 82 prints by using the received image data.

According to the present invention, it is possible to accurately perform A/D conversion by a plurality of A/D conversion units on an electric signal output from each of a plurality of light receiving elements that perform photoelectric conversion.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A photoelectric conversion device comprising:
   a plurality of light receiving elements that are arrayed in one direction and that convert light signals into electrical signals;
   a plurality of A/D converters that perform A/D conversion on the electrical signals output from the light receiving elements; and
   an offset circuit configured to provide an offset voltage of a certain level to the electrical signals output from the light receiving elements to prevent a constant current from flowing before the electrical signals are input into the A/D converters,
   wherein
   the A/D converters are arrayed in the one direction along the light receiving elements, and applied with a reference voltage through first wiring extending in the one direction from a reference voltage source provided on one end side of the array, and
   the offset circuit further comprises:
      a plurality of offset generators that generate offset voltages by making a certain amount of shift in voltage with respect to the reference voltage applied to the A/D converters through the first wiring, and
      a plurality of amplifiers that
         receive, through their respective non-inverting input terminals, the offset voltages generated by the offset generators,
         receive, through their respective inverting input terminals, electrical signals output from the light receiving elements, and
         output the electrical signals to the A/D converters.

2. An image reading apparatus comprising the photoelectric conversion device according to claim 1.

3. An image forming apparatus comprising:
   the image reading apparatus according to claim 2; and
   an image former that forms an image based on image data read by the image reading apparatus.

4. The photoelectric conversion device according to claim 1, wherein
   at least one amplifier includes transistor-gate inputs, and
   the transistor-gate inputs of the at least one amplifier are formed by metal oxide semiconductor (MOS) transistors.

5. A method of photoelectric conversion performed in a photoelectric conversion device that includes
   a plurality of light receiving elements that are arrayed in one direction and each convert a light signal into an electrical signal; and
   a plurality of A/D converters that perform A/D conversion on the electrical signals output from the light receiving elements,
   the method comprising:
   providing an offset voltage of a certain level to the electrical signals output from the light receiving elements to prevent a constant current from flowing before the electrical signals are input into the A/D converters,
   wherein
   the A/D converters are arrayed in the one direction along the light receiving elements, and applied with a reference voltage through first wiring extending in the one direction from a reference voltage source provided on one end side of the array, and
   the method further comprises:
      generating offset voltages by making a certain amount of shift in voltage with respect to the reference voltage applied to the A/D converters through the first wiring,
      receiving, by a plurality of amplifiers and through their respective non-inverting input terminals, the offset voltages generated,
      receiving, by the plurality of amplifiers and through their respective inverting input terminals, electrical signals output from the light receiving elements, and
      outputting, by the plurality of amplifiers, the electrical signals to the A/D converters.

* * * * *